US005102729A

United States Patent [19]

Yamaguchi et al.

[11] Patent Number: 5,102,729

[45] Date of Patent: Apr. 7, 1992

[54] SPEAKER DIAPHRAGM

[75] Inventors: Tetsuo Yamaguchi, Nishinomiya; Hiroomi Matsushita, Kobe; Kunio Niwa, Nishinomiya, all of Japan

[73] Assignee: Sumitomo Rubber Industries, Ltd., Hyogo, Japan

[21] Appl. No.: 715,737

[22] Filed: Jun. 18, 1991

Related U.S. Application Data

[63] Continuation of Ser. No. 321,070, Mar. 9, 1989, abandoned.

[30] Foreign Application Priority Data

Mar. 9, 1988 [JP] Japan .............................. 63-57268

[51] Int. Cl.[5] .............................................. B32B 27/00

[52] U.S. Cl. .................................. 428/290; 181/169; 428/256; 428/260; 428/273; 428/408; 428/902

[58] Field of Search ............... 428/260, 256, 273, 290, 428/292, 408, 902; 181/169, 170

[56] References Cited

U.S. PATENT DOCUMENTS

| | | | |
|---|---|---|---|
| 4,460,060 | 7/1984 | Hasumi et al. | 428/902 |
| 4,532,275 | 7/1985 | Aito et al. | 428/902 |
| 4,552,243 | 11/1985 | Melillo et al. | 428/902 |

*Primary Examiner*—James J. Bell

*Attorney, Agent, or Firm*—Birch, Stewart, Kolasch & Birch

[57] ABSTRACT

Disclosed are a speaker diaphragm formed from a polyamide resin reinforced with continuous fiber reinforcements and/or long fiber reinforcements, and a production method therefor. The speaker diaphragm has high internal loss and excellent specific modulus so as to produce a large sound volume, and has reduced high frequency distortion, flat frequency characteristics and reduced sound distortion for the capability of faithfully reproducing low volume sound.

13 Claims, 1 Drawing Sheet

SPEAKER DIAPHRAGM

This application is a continuation of application Ser. No. 07/321,070 filed on Mar. 9, 1989 now abandoned.

FIELD OF THE INVENTION

The present invention relates to a speaker diaphragm which can produce a large sound volume, and has reduced high frequency distortion, flat frequency characteristics and reduced sound distortion, and a process for preparing the same.

BACKGROUND OF THE INVENTION

Speaker diaphragms are generally desired to have various characteristics, such as reduced high frequency distortion and reduced sound distortion. Such characteristics are mostly based upon physical properties (e.g. specific modulus, internal loss etc.) inherent to materials constituting the speaker diaphragms.

The speaker diaphragms are generally produced from paper, olefin resin, carbon fiber-reinforced epoxy resin, polyester and the like. Since paper has good physical properties in elasticity and internal loss, it is most commonly used for the speaker diaphragms. Paper, however, is susceptible when exposed to the external atmosphere, for example water, direct sun-light and ultraviolet rays.

A speaker diaphragm produced from olefin resin has higher internal loss than that of paper, and has flat frequency characteristics and reduced sound distortion. It, however, has low specific modulus and large sound distortion at a high frequency range.

A speaker diaphragm produced from carbon fiber-reinforced epoxy resin or polyester has a higher specific modulus than that of paper and has low sound distortion at a high frequency. It also has excellent heat resistance and weather resistance. The diaphragm is equal to paper in internal loss and therefore is not perfect.

SUMMARY OF THE INVENTION

The present invention provides a speaker diaphragm which has high internal loss and excellent specific modulus so as to produce a large sound volume, and has reduced high frequency distortion, flat frequency characteristics and reduced sound distortion for the capability of faithfully reproducing low sound. The speaker diaphragm of the present invention is formed from a polyamide resin reinforced with continuous fiber reinforcements and/or long fiber reinforcements.

The present invention also provides a process for preparing the speaker diaphragm, comprising putting continuous fiber reinforcements and/or long fiber reinforcements into a mold and pouring a molding composition comprising ω-lactams, polymerization catalysts and polymerization initiators into it, followed by heating.

DETAILED DESCRIPTION OF THE INVENTION

Figure 1:
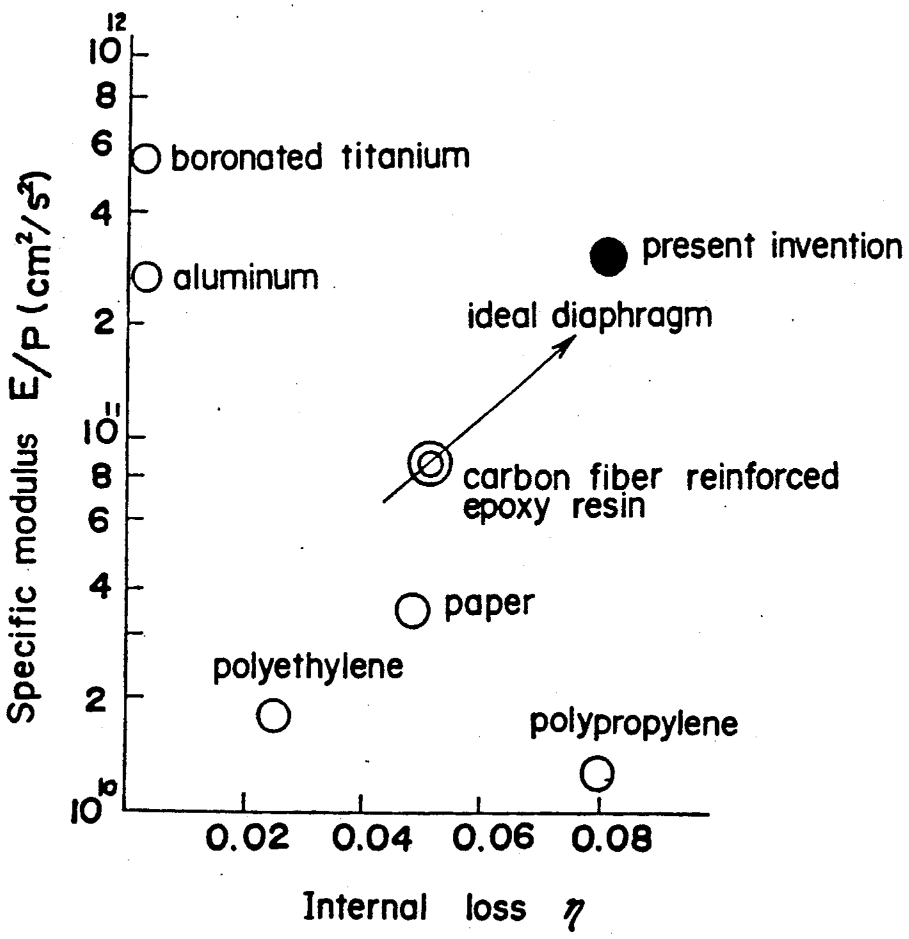
FIG. 1 shows a graph in which the values of internal loss were plotted.

The continuous or long fiber reinforcements are carbon fiber, aramide fiber, glass fiber, alumina fiber, carbon-silica fiber, steel fiber, amorphous metal fiber and a mixture thereof. The reinforcements are used in the form of cloth and mat.

The ω-lactams which are used as the monomer in the present invention include α-pyrrolidone, α-piperidone, ε-caprolactam, ω-enantholactam, ω-caprylolactam, ω-pelargonolactam, ω-decanolactam, ω-undecanolactam, ω-laurolactam, an alkylated compound thereof and a mixture thereof. Preferred lactams are ε-caprolactam and ω-laurolactam.

The polymerization catalysts employed in the present invention are those used for polymerizing ω-lactams, for example sodium hydride, lithium hydride, sodium metal, potassium metal and the like. Sodium hydride is preferred. The catalysts are present in an amount of 0.1 to 5.0 mol % based on the amount of the ω-lactams.

The polymerization initiators employed in the present invention are N-acetyl-ε-caprolactam, triallyl isocyanulate, N-substituted ethyleneimine, 1,1'-carbonyl bisaziridine, oxazoline and a derivative thereof, 2-(N-phenylbenzimidoyl)acetoanilide, 2-N-morpholinocyclohexene-1,3-dicarboxanilide, isocyanates, carbodiimides and the like. Preferred is N-acetyl-ε-caprolactam. The initiators are present in an amount of 0.05 to 1.0 mol % based on the amount of ω-lactam.

The molding compositions contain the above mentioned components. Most preferred molding compositions are Nylon reaction injection molding compositions which are commercially available from Ube Industries, Ltd. as, for example, UX-21. These commercially available molding compositions may generally contain soft components for modifying physical properties of a molded article, in addition to the above mentioned components. The soft components can be polymers which have functional groups reactive with the polymerization initiators and have a low glass transition temperature (Tg). Examples of the soft components are polyether, liquid polybutadiene and the like.

The speaker diaphragm of the present invention can be prepared by molding in a mold in which the continuous and/or long fiber reinforcements are already put. Molding can be carried out by pouring the molding composition and heating to cure. A heating temperature is generally 120° to 200 ° C. In order to improve surface appearance, nonwoven fabric can be placed in the mold with the reinforcement. Nonwoven fabric generally includes glass fiber paper, carbon fiber paper, polyester nonwoven fabric, nylon nonwoven fabric and the like.

The speaker diaphragm of the present invention has high internal loss and excellent specific modulus so as to make big sound, and has reduced high frequency distortion, flat frequency characteristics and reduced sound distortion for the capability of faithfully reproducing low sound. It also has excellent heat resistance and very strong to external conditions.

EXAMPLES

The present invention is further illustrated by the following Examples which, however, are not to be construed as limiting the present invention to their details.

EXAMPLE 1

Carbon fiber cloth (available from Toho Rayon Co., Ltd. as Carbon Fiber Cloth W 3101) was put in a mold. The carbon fiber was preliminary treated with a 0.5% methanol solution of a Nylon fiber surface treatment agent which is available from Toray Corporation as AQ Nylon (A-70). The mold was heated to 150° C. at 0.1 to 1 torr at which it was dried for about 30 minutes. Then, two packages of the molding composition (available from Ube Industries, Ltd. as RIM Nylon UX-21) were mixed at 90° C. and poured into the mold. After about two minute, the molded diaphragm was taken out and subjected to the measurement of specific modulus and internal loss. The diaphragm had about 50% by weight of fiber. The Nylon resin had an intrinsic viscosity of 3.07 according to ISO 307 using a solvent of m-cresol. The specific modulus is a quotient of elastic modulus divided by density and the elastic modulus was measured by a tensile tester available from Intensco Company. The internal loss was measured by a spectrometer available from RHESCA Company as RD-100 AD. The results are shown in Table 1.

The same measurement was conducted to speaker diaphragms produced from carbon fiber-reinforced epoxy resin, paper and polypropylene resin and their results are shown in Table 1, provided that internal loss values of paper and polypropylene are not actually measured and relied upon a literature.

TABLE 1

| | Specific modulus ($cm^2/sec^2$) | Internal loss | |
|---|---|---|---|
| | | Literature | Measurement |
| Carbon fiber reinforced epoxy* | $9.1 \times 10^{10}$ | 0.05 | 0.025 |
| Paper | $4.0 \times 10^{10}$ | 0.05 | — |
| Polypropylene | $1.8 \times 10^{10}$ | 0.08 | — |
| Present Invention | $30.7 \times 10^{10}$ | — | 0.08 |

*An epoxy resin which contains 20 to 30% by weight of carbon fiber short fiber.

The values of internal loss in Table 1 were plotted in a graph in which an ordinate is internal loss and an abscissa is specific modulus, which is shown in FIG. 1. In FIG. 1, polyethylene, aluminum and boronated titanium were relied upon literatures. An arrow mark on carbon fiber reinforced epoxy resin shows the direction of an ideal diaphragm and it is therefore understandable that the diaphragm of the present invention is on the direction.

We claim:

1. A speaker diaphragm composition which consists essentially of a polyamide resin reinforced with continuous fiber reinforcements and/or long fiber reinforcements, wherein said polyamide resin is formed from at least a ω-lactam monomer, polymerization catalyst and polymerization initiator, and wherein said polyamide resin contains 10 to 80% by weight of the continuous fiber reinforcements and/or long fiber reinforcements.

2. The speaker diaphragm according to claim 1 wherein said fiber reinforcements are pretreated with a Nylon surface treatment agent for imparting alcohol solubility, water solubility or both.

3. The speaker diaphragm according to claim 1 or claim 2 wherein said polyamide resin has an intrinsic viscosity (η) of at least 1.8.

4. The speaker diaphragm according to claim 1 wherein the continuous or long fiber reinforcements are selected from the group consisting of carbon fiber, aramide fiber, glass fiber, alumina fiber, carbon-silica fiber, steel fiber, amorphous metal fiber and mixtures thereof, and wherein said reinforcements are of a cloth or mat.

5. The speaker diaphragm according to claim 2 wherein the continuous or long fiber reinforcements are selected from the group consisting of carbon fiber, aramide fiber, glass fiber, alumina fiber, carbon-silica fiber, steel fiber, amorphous metal fiber and mixtures thereof, and wherein said reinforcements are of a cloth or mat.

6. The speaker diaphragm according to claim 1 wherein the ω-lactam monomer is selected from the group consisting of α-pyrrolidone, α-piperidone, ε-caprolactam, ω-enantholactam, ω-caprylolactam, ω-pelargonolactam, ω-decanolactam, ω-undecanolactam, ω-laurolactam, alkylated compounds thereof and mixtures thereof.

7. The speaker diaphragm of claim 1 wherein the ω-lactam monomer is ε-caprolactam or ω-laurolactam.

8. The speaker diaphragm of claim 1 wherein the polymerization catalyst is present in an amount of from 0.1 to 5.0 mol % based on the amount of ω-lactam monomer and is selected from the group consisting of sodium hydride, lithium hydride, sodium metal and potassium metal.

9. The speaker diaphragm of claim 8 wherein the polymerization catalyst is sodium hydride.

10. The speaker diaphragm of claim 1 wherein the polymerization initiator is present in an amount of 0.05 to 1.0 mol % based on an amount of ω-lactam monomer and is selected from the group consisting of N-acetyl-ε-caprolactam, triallyl isocyanulate, N-substituted ethyleneimine, 1,1'-carbonyl bis aziridine, oxazoline, 2-(N-phenylbenzimidoyl)acetoanilide, 2-N-morpholino-cyclohexene-1,3-dicarboxanilide, isocyanates, and carbodiimides.

11. The speaker diaphragm of claim 10 wherein the polymerization initiator is N-acetyl-ε-caprolactam.

12. The speaker diaphragm of claim 6 wherein an polymerization catalyst is present in an amount of from 0.1 to 5.0 mol % based on the amount of ω-lactam monomer and is selected from the group consisting of sodium hydride, lithium hydride, sodium metal and potassium metal.

13. The speaker diaphragm of claim 12 wherein the polymerization initiator is present in an amount of 0.05 to 1.0 mol % based on an amount of ω-lactam monomer and is selected from the group consisting of N-acetyl-ε-caprolactam, triallyl isocyanulate, N-substituted ethyleneimine, 1,1'-carbonyl bis aziridine, oxazoline, 2-(N-phenylbenzimidoyl)acetoanilide, 2-N-morpholino-cyclohexene-1,3-dicarboxanilide, isocyanates, and carbodiimides.

* * * * *